United States Patent [19]
Gordon

[11] Patent Number: 4,489,823
[45] Date of Patent: Dec. 25, 1984

[54] SCRAPER BLADE FOR A BELT CONVEYOR

[76] Inventor: James R. Gordon, 301 W. Boling, Benton, Ill. 62812

[21] Appl. No.: 406,366

[22] Filed: Aug. 9, 1982

[51] Int. Cl.³ ............................................. B65G 45/00
[52] U.S. Cl. ................................... 198/499; 15/256.5
[58] Field of Search ................................ 198/497–499; 15/256.5, 256.51, 256.6

[56] References Cited

U.S. PATENT DOCUMENTS

| 2,766,979 | 10/1956 | Calder | 198/498 X |
| 4,202,437 | 5/1980 | Gordon | 198/497 |
| 4,331,993 | 5/1982 | Pfost et al. | 15/256.5 |

FOREIGN PATENT DOCUMENTS 509311 7/1939 United Kingdom ............... 198/499

Primary Examiner—Joseph E. Valenza
Assistant Examiner—David A. Bucci
Attorney, Agent, or Firm—Kinzer, Plyer, Dorn & McEachran

[57] ABSTRACT

An improved scraper blade for use in cleaning particulate conveyed material from a belt conveyor, the blade being mounted on a shaft which extends across the conveyor belt in spaced relation thereto. The scraper blade includes an elongated block of molded elastomer material, mounted on the shaft, which has a leading edge and a trailing edge extending across and in contact with the conveyor belt. The scraper blade surface intermediate its leading and trailing edges has a shallow concavity or pocket, spaced from the belt, in which a limited quantity of particulate conveyed material collects. The collected material itself scrapes the conveyor belt to assist in dislodging particulate matter from the belt.

4 Claims, 5 Drawing Figures

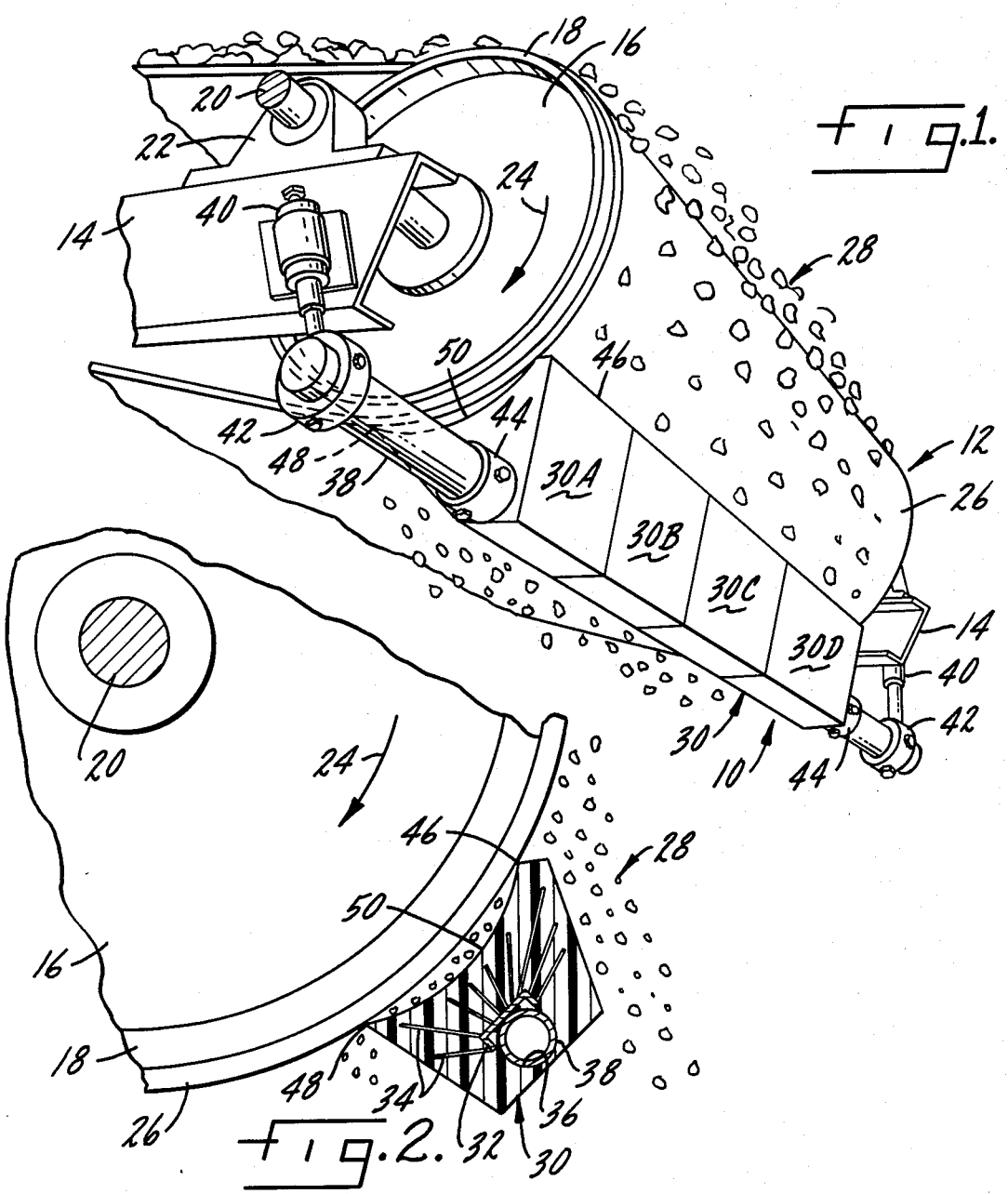
fig.1.
fig.2.
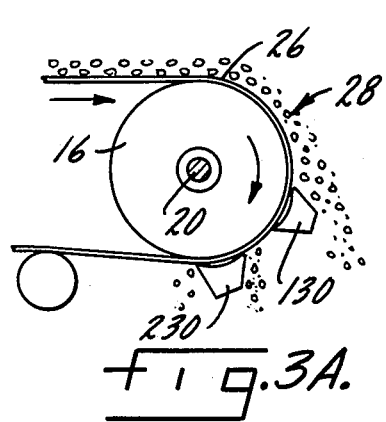
fig.3A.
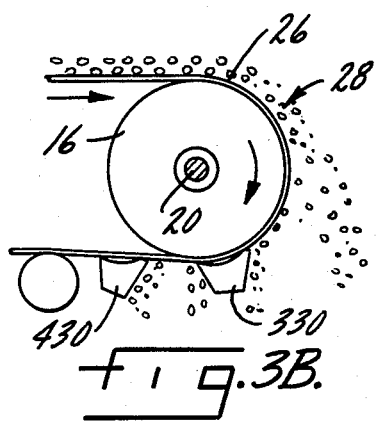
fig.3B.
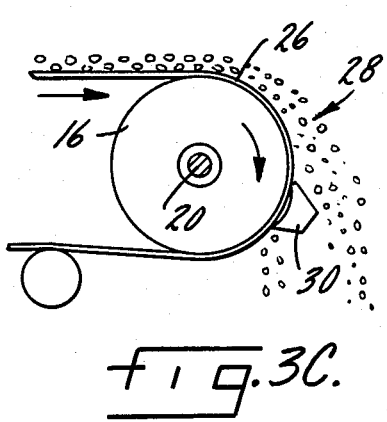
fig.3C.

SCRAPER BLADE FOR A BELT CONVEYOR

BACKGROUND OF THE INVENTION

This invention relates to conveyor scrapers used to remove particulate conveyed material from belt conveyors. Scrapers are typically employed at the head pulley end of a conveyor, where the bulk of the conveyed material is discharged from the conveyor. However, in many applications a residual film or layer of conveyed material clings to the belt after the usual discharge point. Typically, the residual material comprises the finer elements of the material being conveyed. A high moisture content in the conveyed material increases the difficulty of removing residual material from the belt. This is often the case in mining operations and similar applications.

Devices for cleaning a belt conveyor are well-known. These devices typically employ a scraper blade which contacts the belt surface and acts as a barrier to residual material as the belt moves past the scraper blade. It is desirable to make the scraper blade of a material which is softer than the conveyor belt so that the unavoidable wear is primarily taken by the scraper blade rather than the more expensive belt. However, this effort to avoid damaging the belt can lead to inefficient belt cleaning as the scraper blade becomes worn away. Frequent adjustment of the scraper blade position and periodic replacement of scraper blades decreases cleaning efficiency and increases down time.

It is an object of this invention to provide a scraper blade having increased useful life together with increased cleaning efficiency.

Another object is to provide a scraper blade which utilizes a limited quantity of the conveyed material to provide a wearing surface for the blade.

Another object is to provide an improved scraper blade which readily accommodates a substantial range of different belt widths.

Accordingly, the invention is directed to an improved scraper blade for a scraper employed to clean particulate conveyed material from a belt conveyor. The scraper is mounted on a scraper shaft having its opposite ends supported in a pair of tensioning supports located at opposite sides of a conveyor belt. The scraper shaft extends across the conveyor belt in spaced relation thereto. The scraper blade itself comprises an elongated block of molded elastomer material mounted on the scraper shaft. The scraper blade has a leading edge extending across and engaging the conveyor belt at one transverse position and a trailing edge extending across and engaging the conveyor belt at a second transverse position spaced from the first position. The surface of the blade intermediate its leading and trailing edges has a shallow concavity of curved configuration spaced from the belt. The depth of the concavity is only sufficient to collect a limited quantity of particulate conveyed material therein. This trapped conveyed material acts as a wearing surface that extends the useful life of the blade.

BRIEF DESCRIPTION OF THE DRAWINGS

FIG. 1 is a perspective view of a scraper assembly in position at the head pulley of a conveyor.

FIG. 2 is an end elevation view of a head end pulley with an associated scraper blade, the blade being shown in section.

FIGS. 3A, 3B and 3C are end elevation showing alternate arrangements for application of the scraper blades of the invention.

DESCRIPTION OF A PREFERRED EMBODIMENT

A scraper blade assembly 10 according to the present invention is shown in FIG. 1. The scraper 10 is in an operative position in a conveyor system 12. The conveyor system 12 includes side frame members 14 which are suitably connected to a conveyor base (not shown). A head pulley or drum 16 has an outer rim 18 and a support shaft 20. The support shaft is mounted for rotation in pillow blocks as at 22. A conventional drive mechanism (not shown) turns the pulley 16 in the direction of arrow 24. An endless belt conveyor 26 passes around the pulley 16 and a tail pulley (not shown), which may be similar to the head pulley 16. The belt 26 carries particulate conveyed material 28 on its forward run, the conveyed material being discharged from the conveyor belt at the head pulley 16 to a suitable receptacle or to another conveyor. The scraper assembly 10 cleans the belt 26 at or near the point where it begins its return run. It will be understood that some parts of a typical conveyor system, such as skirt boards, aprons, and screens, have been omitted for clarity.

The scraper assembly 10 includes a scraper blade 30. In a preferred form the blade 30 is made of an elongated block of molded elastomer material such as urethane. As seen in FIG. 2, the elasomer material is molded around a steel channel 32. The rigidity of the blade may be further enhanced by a multiplicity of wire bristles 34 welded or otherwise affixed to and radiating from the channel 32. The bristles are molded into the blade. A mounting bore 36 is formed in the block of elastomer material so that a scraper shaft 38 can fit therethrough to mount the blade 30. The scraper shaft 38 is supported by two tensioning supports 40 located at opposite sides of the conveyor belt and preferably connected to the frame members 14 (FIG. 1). The tensioning supports 40 may be of the type shown in Gordon, U.S. Pat. No. 4,202,437 or they may be spring-loaded devices which automatically adjust the tension of the scraper blade on the conveyor belt. The lower ends of the tensioning supports 40 have collars 42 which engage the scraper shaft 38 and hold it in fixed position with the scraper shaft extending across the conveyor belt 26 in spaced relation thereto. The collars 42 include locking bolts which allow angular adjustment of the scraper shaft 38. This in turn allows adjustment of the orientation of the scraper blade 30 relative to the belt 26.

In a preferred embodiment the scraper blade 30 is formed in a plurality of individual sections. These sections are labeled in FIG. 1 as 30A, 30B, 30C and 30D. This modular approach allows assembly of a composite blade 30 having as many sections as needed to span the width of the belt 26. The scraper sections are held fast on the shaft 38 by a pair of locking sleeves 44.

FIG. 2 shows the cross-sectional configuration of the scraper blade 30. The blade has a leading edge 46 extending across the width of the conveyor belt and engaging the belt at one transverse position. A trailing edge 48 of the scraper 30 extends across the belt, engaging it at a second transverse position which is spaced from the first position of the leading edge 46. Between the leading and trailing edges 46 and 48 the blade has a shallow concavity or pocket 50 spaced from the belt. The concavity has a curved configuration with a radius of curvature which is less than that of the pulley 16. The depth of the concavity or pocket 50 is only sufficient to collect a limited quantity of particulate conveyed material therein. The pocket 50 extends across the full width of the belt 26.

The advantage of the concave configuration of the scraper blade 30 is that it provides a large scraping surface even though only a small portion of the elastomer material is in actual contact with the conveyor belt 26. That is, the particulate conveyed material which is trapped between the leading and trailing edges of the blade becomes a wearing surface which tends to dislodge material from the belt. In other words, trapped material in the concave pocket 50 scrapes the residual material from the belt. The trapped material provides a buffer so that the concave surface of the pocket 50 is not itself directly exposed to wear. This prolongs the useful life of the scraper blade.

A further advantage of the scraper blade of this invention is the self-adjusting nature of the scraping action provided by the trapped material in the concavity 50. Since the trapped material is the same type of particulate matter as that being removed from the belt, the abrasion characteristics for the trapped material are the same as for the material to be removed. Thus the scraping action in the concavity tends to loosen particles from the belt for their eventual removal either out of the ends of the scraper or past the trailing edge 48.

FIGS. 3A, 3B and 3C show alternate applications of scraper assemblies to a head pulley. Depending upon the material being conveyed and space limitations at the area of the head pulley 16, it may be desirable to have one or more scraper blades located at different orientations about the head pulley. In FIG. 3A two scraper blades 130 and 230 are located at the side and near the bottom of the pulley 16. In FIG. 3B a scraper blade 330 is located near the bottom of the head end pulley 16 while a second scraper blade 430 is located remote from the pulley, on the return side of the conveyor belt. In FIG. 3C the single scraper blade 30 is located at the side of the pulley, as in FIGS. 1 and 2.

I claim:

1. An improved scraper blade for a scraper employed to scrape particulate conveyed material from a belt conveyor, the scraper being of the kind comprising a scraper shaft having its opposite ends supported in a pair of tensioning supports located at opposite sides of a conveyor belt, the scraper shaft extending across the conveyor belt in spaced relation thereto, the improved scraper blade comprising:

an elongated block of molded elastomer material mounted on the scraper shaft, the scraper blade having a leading edge extending across and engaging the conveyor belt at one transverse position and a trailing edge extending across and engaging the conveyor belt at a second transverse position spaced from the first position, the surface of the blade intermediate its leading and trailing edges comprising a shallow concavity spaced from the belt, the depth of the concavity being only sufficient to collect a limited quantity of particulate conveyed material therein.

2. The scraper blade of claim 1 wherein the belt conveyor extends around a pulley and the radius of curvature of the pulley is greater than the radius of curvature of the concavity of the scraper blade.

3. The scraper blade of claim 1 further comprising a longitudinal metal reinforcement member embedded in the block of molded elastomer material, and a multiplicity of metal reinforcement elements affixed to the reinforcement member and radiating outwardly toward the scraping surface of the blade.

4. The scraper blade of claim 1, claim 2, or claim 3 wherein the scraper blade comprises at least two separate blade sections, mounted end-to-end on the scraper shaft.

* * * * *